United States Patent
Cohen et al.

(10) Patent No.: US 9,679,610 B2
(45) Date of Patent: Jun. 13, 2017

(54) METHODS AND DEVICES FOR DISTRIBUTED AUDIO/VIDEO SYNCHRONIZATION AND PLAYBACK USING AN A/V ORCHESTRATOR

(71) Applicant: MUVIX MEDIA NETWORKS LTD, Petah Tikva (IL)

(72) Inventors: Alon Cohen, Zikhron Ya'akov (IL); Ilan Shiber, Ganei Tikva (IL); Gil Fidel, Petah Tikva (IL)

(73) Assignee: MUVIX MEDIA NETWORKS LTD, Petah Tikva (IL)

( * ) Notice: Subject to any disclaimer, the term of this patent is extended or adjusted under 35 U.S.C. 154(b) by 0 days.

(21) Appl. No.: 14/980,917

(22) Filed: Dec. 28, 2015

(65) Prior Publication Data
US 2016/0196851 A1 Jul. 7, 2016

Related U.S. Application Data

(60) Provisional application No. 62/099,167, filed on Jan. 1, 2015.

(30) Foreign Application Priority Data

Aug. 30, 2015 (IL) .......................... 240927

(51) Int. Cl.
*H04N 5/932* (2006.01)
*G11B 27/32* (2006.01)
(Continued)

(52) U.S. Cl.
CPC .......... *G11B 27/326* (2013.01); *G11B 27/005* (2013.01); *G11B 27/34* (2013.01);
(Continued)

(58) Field of Classification Search
CPC ...... H04N 5/85; G11B 27/10; G11B 2220/90; G11B 20/10527; G11B 27/105
(Continued)

(56) References Cited

U.S. PATENT DOCUMENTS

| | | |
|---|---|---|
| 2012/0042047 A1 | 2/2012 | Chen et al. |
| 2014/0010515 A1 | 1/2014 | Lee et al. |
| 2014/0122562 A1* | 5/2014 | Turner ............... H04N 21/4384 709/203 |

FOREIGN PATENT DOCUMENTS

| | | | |
|---|---|---|---|
| EP | 2 592 842 A1 | 5/2013 | |
| EP | 2 736 263 A1 | 5/2014 | |

(Continued)

OTHER PUBLICATIONS

Jochen Miroll et al; "Reverse genlock for synchronous tiled display walls with Smart Internt Displays", Consumer Electronics—Berlin (ICCE—Berlin), 2012 IEEE, Sep. 3, 2012 pp. 236-240, XP032256504.

*Primary Examiner* — William C Vaughn, Jr.
*Assistant Examiner* — Daniel Tekle
(74) *Attorney, Agent, or Firm* — Reuven K. Mouallem LL.M.; FlashPoint IP Ltd.

(57) ABSTRACT

The present invention discloses methods and devices for distributed audio/video (A/V) synchronization and playback. Methods include the steps of: enabling identification of an A/V orchestrator by at least one external A/V system using a data-exchange protocol system; enabling configuration information to be available to at least one external A/V system; identifying A/V data from an A/V source to at least one external A/V system; repetitively synchronizing at least one respective system clock with an orchestra timing on the A/V orchestrator; and repetitively sending at least one synchronization notification to at least one external A/V system, wherein at least one synchronization notification is (Continued)

configured to: indicate a given timing in the orchestra timing during A/V playback, indicate a given position in the A/V data during A/V playback; and instruct at least one external A/V system to move to a currently-playing A/V segment in the A/V data for A/V playback.

21 Claims, 3 Drawing Sheets

(51) Int. Cl.
| | |
|---|---|
| *H04L 29/06* | (2006.01) |
| *G11B 27/34* | (2006.01) |
| *H04N 5/04* | (2006.01) |
| *H04N 21/242* | (2011.01) |
| *H04N 21/43* | (2011.01) |
| *H04N 21/6543* | (2011.01) |
| *H04N 21/8547* | (2011.01) |
| *G11B 27/00* | (2006.01) |
| *H04N 5/765* | (2006.01) |
| *H04N 21/414* | (2011.01) |
| *H04N 21/436* | (2011.01) |

(52) U.S. Cl.
CPC ........... *H04L 65/4076* (2013.01); *H04N 5/04* (2013.01); *H04N 5/765* (2013.01); *H04N 21/242* (2013.01); *H04N 21/4302* (2013.01); *H04N 21/6543* (2013.01); *H04N 21/8547* (2013.01); *H04N 21/41415* (2013.01); *H04N 21/43615* (2013.01)

(58) Field of Classification Search
USPC ......................................................... 386/201
See application file for complete search history.

(56) References Cited

FOREIGN PATENT DOCUMENTS

| | | |
|---|---|---|
| WO | WO 2012/018300 A2 | 2/2012 |
| WO | WO 2014/078818 A1 | 5/2014 |

* cited by examiner the audio and video transcriptions are synchronized to each
METHODS AND DEVICES FOR DISTRIBUTED AUDIO/VIDEO SYNCHRONIZATION AND PLAYBACK USING AN A/V ORCHESTRATOR

CROSS REFERENCE TO RELATED APPLICATIONS

This patent application claims priority to U.S. Provisional Patent Application No. 62/099,167, filed Jan. 1, 2015, and Israel Patent Application No. 240927, filed Aug. 30, 2015, which are hereby incorporated by reference in their entirety.

FIELD AND BACKGROUND OF THE INVENTION

The present invention relates to methods and devices for distributed audio/video (A/V) synchronization and playback using an A/V orchestrator.

Modern electronic appliances are becoming ubiquitous for personal as well as business use. A/V systems are used in numerous fields of work and a variety of locations. An essential requirement in most A/V use-cases is to ensure that the audio and video transmissions are synchronized to each other in order to avoid different types of synchronization errors such as lip-sync error. However, such a basic requirement of ensuring A/V synchronization becomes challenging in situations in which one is interested in using two or more standalone A/V systems in order to display and play the same content or associated content simultaneously on all of the systems, while keeping audio and video streams fully synchronized.

For instance, such a situation arises if one is interested in displaying a movie on one or more large TV screens while simultaneously and synchronously playing the soundtrack on one or more smartphones. The motivation for splitting the A/V outputs in such a way might be in order to let viewers listen to the movie's soundtrack via headphones or via other peripheral devices connected to their personal smartphones. Alternatively, the purpose of such a system configuration might be to enable viewers to listen to a personalized or language-specific soundtrack via independently-connected headphones rather than to a single, shared soundtrack.

Whatever the reason for such a concerted "display/play" mode might be, in all cases it is crucial to be able to fully synchronize the A/V outputs, such that no lip-sync errors are introduced to any of the standalone A/V systems.

Another example of a need for a concerted display/play-mode A/V system is when one is interested in displaying video content, or several versions of primarily-similar video content, on one or more smartphones or one or more TV displays or monitors, while keeping all video outputs synchronized with a main audio system on which a soundtrack is centrally played.

In all such cases mentioned as well as variants of the above, today's rigid centralized approach to A/V synchronization relies on a tight connection between the A/V systems (i.e., "tight" in the sense that any A/V stream being sent must reach its destination quickly enough in order to maintain A/V synchronization throughout the system) to ensure no synchronization errors occur. This approach would not be suitable, and definitely not optimal, for the demands of most A/V applications and environments mentioned above.

Such a case is similar to a one-man band in which a single player manages the entire synchronization, as opposed to an orchestra in which a large group cooperates together, with each member being responsible for his/her synchronization according to the tempo set by the orchestrator.

In the prior art, Chen et al. (US Patent Publication No. 2012/0042047) recites a method for synchronizing and triggering an initial playback event by sending a single, scheduled event command.

It would be desirable to have methods and devices for distributed A/V synchronization and playback using an A/V orchestrator. Such methods and devices would, inter alia, overcome the various limitations mentioned above.

SUMMARY

It is the purpose of the present invention to provide methods and devices for distributed A/V synchronization and playback using an A/V orchestrator.

It is noted that the term "exemplary" is used herein to refer to examples of embodiments and/or implementations, and is not meant to necessarily convey a more-desirable use-case. Similarly, the terms "alternative" and "alternatively" are used herein to refer to an example out of an assortment of contemplated embodiments and/or implementations, and is not meant to necessarily convey a more-desirable use-case. Therefore, it is understood from the above that "exemplary" and "alternative" may be applied herein to multiple embodiments and/or implementations. Various combinations of such alternative and/or exemplary embodiments are also contemplated herein.

For purposes of clarity, several terms are defined herein. The term "standalone" is used herein to refer to a system independently having its own separate A/V player, audio and/or video control units, audio and/or video output devices, and system clock. The term "synchronized" is used herein to refer to a state in which audio and video streams are aligned in time to within a detectable human limit for perceiving synch errors (i.e., about 20 ms). The term "high-latency conditions" is used herein to refer to any system process in operation exceeding at least in part a transmission time of about 30 ms.

The term "low-enough latency" is used herein to refer to a communication medium that doesn't introduce delays deemed significant which are longer than the detectable human limit for perceiving synch errors during normal operation. The term "high-enough bandwidth" is used herein to refer to a communication medium that can deliver A/V streams to a component on time without causing delays longer than the detectable human limit for perceiving synch errors during normal operation.

Embodiments of the present invention enable distributed, cross-synchronization using an A/V "orchestrator" to which multiple standalone A/V systems (i.e., multiple A/V players in the A/V "orchestra") can join and take part in an orchestrated display/play performance. The standalone A/V systems interact with the A/V orchestrator via a "client" component which serves like the "score" of the A/V performance, leading the concerted play-display synchronization. Such A/V orchestrator systems become highly beneficial, and in many cases crucial, in multi-component implementations.

It is understood that A/V components mentioned herein such as the A/V systems, output devices, control units, orchestrators, and storage devices may include their own integrated componentry (i.e., hardware, firmware, and software) for performing their prescribed functions. Thus, componentry such as processors, memory modules, instruction sets, and communication hardware and protocols are implicitly included in the description below of the A/V components.

A typical A/V system is configured as a linked architecture of A/V system components, operationally coupled together through a low-latency connectivity framework, which is required in order to ensure high A/V quality, as well as to meet the stringent A/V synchronization criteria. At the top of the hierarchy is a centralized A/V player, and at the bottom are the A/V output devices (e.g., TV monitors, VGA monitors, video projectors, speakers, wired headphones, and Bluetooth headphones). The A/V player (coupled with a set of system tools) is responsible for synchronizing the A/V streams. A queue of synched A/V segments are delivered by the A/V player downstream to the A/V control units, which in turn renders and transmits the segments to the A/V output devices for play-display synchronization. The process of sending the synchronized A/V streams, and the play-display process has to occur within very strict timing constraints, otherwise synchronization won't be retained.

Any component that doesn't meet the timing constraints, and thus introduces a delay, may lead to synchronization errors such as lip-sync error. As a result of such a strict timing constraint, many processing and connectivity technologies, which might be otherwise useful, cannot be implemented in such applications. For instance, only networking platforms that can guarantee a low-enough latency and high-enough bandwidth continuously during use can be considered for connecting A/V output devices in such applications. Such limitations lead to the use of relatively simple and non-scalable connectivity technologies such as direct hard-wiring, AM/FM transmission, or Bluetooth networking (e.g., for wireless headphones). Any attempt to connect the A/V player with the A/V output devices via a more complex and scalable networking solution, such as Wi-Fi or Ethernet, wouldn't be optimal since A/V synchronization might not be preserved.

While the strict connectivity requirements (due to the stringent latency and bandwidth criteria) within a single A/V system is challenging enough, tight connection between more than one A/V system for play-display synchronization is even a bigger challenge. As a result, most current implementations that try to achieve such a cross-system, play-display capability forfeit synchronization altogether unless the connectivity technologies implemented are limited to the simple ones mentioned above.

Embodiments of the present invention provide methods and devices for employing a distributed A/V synchronization and playback scheme, which enable two or more standalone A/V systems (e.g., TV sets, computers, tablets, and smartphones) to form a kind of "A/V orchestra."

Such an A/V orchestra may operate over any flexible (i.e., having high-latency and/or low-bandwidth) networking platform available, wired or wireless, including high-level computer-based networks (e.g., Wi-Fi, Ethernet, cellular 3G/4G, and the Internet), which usually cannot necessarily guarantee low-enough latency and high-enough bandwidth. Once such an A/V orchestra is formed, any standalone A/V system is able to join and synchronously play an audio track associated with video content that is simultaneously displayed on a separate standalone (usually central) A/V system. Conversely, any standalone A/V system is able to join and synchronously display video content associated with an audio track that is simultaneously played on a separate standalone (usually central) A/V system. Such an A/V orchestra enables all such standalone systems to function in a concerted manner, akin to an orchestra, keeping all such A/V streams synchronized—ensuring no synchronization errors are introduced on any A/V system.

As an exemplary implementation, a smartphone (i.e., a standalone A/V system) can play the soundtrack of a cinematic movie displayed on a central video monitor (i.e., a separate standalone A/V system), while ensuring A/V synchronization. Such synchronization occurs just as if the smartphone's audio system was attached as a peripheral device to the video monitor, but without the rigid and strict constraints that would otherwise be imposed on the connectivity between the two components.

As another exemplary implementation, such an A/V orchestrator enables a smartphone to display the video content, or a personalized version of the video content (e.g., a graphically-edited version), associated with a soundtrack that is simultaneously played on a central sound system. Again, such concerted play-display synchronization is enabled while the two components are operationally connected over a flexible and widely-available network (e.g., Wi-Fi or cellular 3G/4G).

Implementations involving more than two standalone components further highlights the benefits of such an A/V orchestrator to simultaneously and synchronously play audio tracks (either distinct or identical) on more than one audio component associated with video content displayed on a central video monitor, or conversely, to simultaneously and synchronously play video content (either distinct or identical) on more than one video component associated with a soundtrack played on a central sound system.

The benefits of such an A/V orchestrator result in part from the connectivity options available for such play-display synchronization. Alternative approaches would require wired connections or non-scalable wireless solutions such as AM/FM transmission or Bluetooth. AM/FM transmission and Bluetooth (BT) are both highly-limited in the number of distinct communication channels that can be simultaneously supported within the same physical environment. Also, such non-scalable wireless solutions usually either limit the number of A/V systems, or the permitted distances between such systems for synchronous operation. These limitations result in a limit on the functionality and/or usability of the A/V systems that can be simultaneously deployed in such an environment.

As an exemplary use-case, given a theatrical screening hall with many viewers, each viewer would like to synchronously listen through headphones to a personalized (e.g., language-specific) version of a soundtrack associated with a centrally-displayed movie. Wired solutions would restrict the viewers' location and mobility, as well as incur high deployment and wiring costs. Wireless solutions such as AM/FM or BT headphones would highly limit the number of distinct audio channels available, and thus the number of viewers that could be simultaneously supported in the same screening hall. Furthermore, limitations on the maximum distance between the A/V output devices would be imposed as well. Implementations using Wi-Fi (or other flexible connectivity solutions) offering unlimited scalability would risk the A/V streams not being synched.

Embodiments of the present invention, inter alia, overcome all such limitations and drawbacks. Features of the present invention include:

using an A/V orchestrator as a "beacon" to coordinate play-display synchronization by:
  broadcasting periodic notifications; and
  providing all A/V systems with the current timestamp of the play-display segment in order to allow each system to resynchronize itself once in a while;

synchronizing all clocks of the A/V systems via the A/V orchestrator in order to allow such a concerted orchestra to function properly; and avoiding bottlenecks created by a central, A/V-transmitting component by allowing each A/V system to acquire relevant A/V data independently, either by reading/receiving the data in advance or during playback.

Such an A/V orchestrator assumes that the following requirements are met.

1. Each A/V system can acquire most, if not all, A/V data segments, before or at the time of each of the segment's playback. Thus, a "read-ahead" buffer containing subsequent segments in the queue to be played, or the entire A/V file, is available on time.
2. It is acceptable for the specific use-case in question to drop or skip audio and/or video segments for the purpose of keeping the A/V streams synchronized.

Such an A/V orchestrator, operating over standard and widely-available computer networks, for play-display synchronization of associated A/V content, inter alia, enables:

use of ubiquitous, mobile, A/V systems (e.g., smartphones, tablets, laptops, and headphone peripherals) as output devices for play-display synchronization with a central A/V system;

removal of connectivity limitations (e.g., wired, AM/FM, and BT) on the maximum distance allowed between A/V output devices;

removal of connectivity limitations (e.g., wired, AM/FM, and BT) on the maximum number of devices simultaneously deployable in the same physical environment;

A/V personalization options for every viewer/listener by further processing the A/V stream at the A/V output device itself while maintaining play-display synchronization;

support for 1×1, N×1, 1×M, and N×M concerted, play-display synchronization such as:

using a smartphone to wirelessly and synchronously listen to a remote video over any available wireless network such as Wi-Fi (i.e., 1 audio by 1 video);

using many smartphones to synchronously deliver distinct (e.g., language-specific) or identical soundtracks to each and every listener watching a central video content (i.e., N audio by 1 video).

using many large displays throughout a screening hall, or many personal tablets, to synchronously display distinct (e.g., same video taken from different angles) or identical video content to each and every viewer listening to a central soundtrack (i.e., 1 audio by M video); and using many large displays throughout a screening hall, to display distinct or identical video content to each and every viewer individually listening to distinct or identical soundtracks played on personal A/V devices, such as headphones connected to smartphones (i.e., N audio by M video); and support for multiple A/V orchestrators in the same physical environment over the same wireless network such as multiple, unrelated screening areas operating in the same screening hall. In each screening area, one or more viewers could watch and listen (in one of the various scenarios listed above) to unrelated A/V content. For example, in one screening area, viewers are watching a centrally-displayed video while synchronously listening to a soundtrack via headphones connected to their smartphones (i.e., N×1), while in another screening area in the same screening hall over the same Wi-Fi network, many displays are displaying video content for viewers listening to distinct, language-specific soundtracks via headphones connected to their smartphones (i.e., N×M).

Therefore, according to the present invention, there is provided for the first time a method for distributed audio/video (A/V) synchronization and playback, the method including the steps of: (a) enabling identification of an A/V orchestrator by at least one external A/V system using a data-exchange protocol system; (b) enabling configuration information to be available to at least one external A/V system; (c) identifying A/V data from an A/V source to at least one external A/V system; (d) repetitively synchronizing at least one respective system clock with an orchestra timing on the A/V orchestrator; and (e) repetitively sending at least one synchronization notification to at least one external A/V system, wherein at least one synchronization notification is configured to: (i) indicate a given timing in the orchestra timing during A/V playback; (ii) indicate a given position in the A/V data during A/V playback; and (iii) instruct at least one external A/V system to move to a currently-playing A/V segment in the A/V data for A/V playback.

Alternatively, the method further includes the step of: (f) enabling calculation, by at least one external A/V system, of the currently-playing A/V segment based on at least one synchronization notification.

Alternatively, the identification is performed by at least one process selected from the group consisting of: using a configuration file, querying a remote service, and listening to a broadcast channel.

Alternatively, at least one external A/V system includes at least one A/V component selected from the group consisting of: a speaker, a wired headphone, a wireless headphone, a Bluetooth headphone, an AM headphone, an FM headphone, a TV monitor, a video monitor, a video projector, and an integrated video display.

Alternatively, the data-exchange protocol system includes at least one connectivity type selected from the group consisting of: a network protocol, a file-system protocol, a communication protocol, a wired connection, a wireless connection, a Bluetooth connection, an Ethernet connection, a cellular connection, a Wi-Fi connection, a 3G connection, and a 4G connection.

Alternatively, the A/V orchestrator is implemented by at least one A/V component configuration selected from the group consisting of: a single A/V orchestrator configured to run as a separate component; a single A/V orchestrator embodied in another A/V component; more than one A/V orchestrator for providing redundant functionality in order to optimize performance; and more than one A/V orchestrator for providing fail-safe backup functionality in order to switch orchestrator control in case of malfunction or connectivity loss.

Alternatively, the A/V data is implemented by at least one source type selected from the group consisting of: an A/V file, multiple A/V files containing segments of A/V data, multiple AV files containing identical A/V data, and at least one A/V streaming source.

Alternatively, at least one synchronization notification includes at least one time-synchronization type selected from the group consisting of: synchronization according to an orchestrator clock on the A/V orchestrator, synchronization according to at least one respective system clock, and synchronization according to an external-component clock.

Alternatively, at least one synchronization notification includes at least one A/V data parameter selected from the group consisting of: a frame number of an A/V frame, a frame timestamp of the A/V frame, a location timestamp of an A/V data location, and a system timestamp of the A/V data location.

Alternatively, the A/V orchestrator is operative under high-latency conditions of the data-exchange protocol system.

Most alternatively, the high-latency conditions are defined as any of steps (a)-(e) exceeding at least in part a transmission time of about 30 milliseconds.

Most alternatively, the high-latency conditions are defined as any of steps (a)-(f) exceeding at least in part a transmission time of about 30 milliseconds.

Alternatively, the step of repetitively sending includes sending additional synchronization notifications in order to adjust in effect a respective A/V playback speed of the A/V data on at least one external A/V system, thereby compensating for playback-speed inaccuracies.

Alternatively, the step of repetitively synchronizing maintains at least one external A/V system in a synchronized state having a deviation within a range of up to about 20 milliseconds.

According to the present invention, there is provided for the first time a device for distributed audio/video (A/V) synchronization and playback, the device including: (a) a CPU for performing computational operations; (b) a memory module for storing data; (c) a network connection for communicating across a data-exchange protocol system; and (d) a synchronization module configured for: (i) enabling identification of an A/V orchestrator, embodied in the synchronization module, by at least one external A/V system using the data-exchange protocol system; (ii) enabling configuration information to be available to at least one external A/V system; (iii) identifying A/V data from an A/V source to at least one external A/V system; (iv) repetitively synchronizing at least one respective system clock with an orchestra timing on the A/V orchestrator; and (v) repetitively sending at least one synchronization notification to at least one external A/V system, wherein at least one synchronization notification is configured to: (A) indicate a given timing in the orchestra timing during A/V playback; (B) indicate a given position in the A/V data during A/V playback; and (C) instruct at least one external A/V system to move to a currently-playing A/V segment in the A/V data for A/V playback.

Alternatively, the synchronization module is further configured for: (vi) enabling calculation, by at least one external A/V system, of the currently-playing A/V segment based on at least one synchronization notification.

Alternatively, the identification is performed by at least one process selected from the group consisting of: using a configuration file, querying a remote service, and listening to a broadcast channel.

Alternatively, at least one external A/V system includes at least one A/V component selected from the group consisting of: a speaker, a wired headphone, a wireless headphone, a Bluetooth headphone, an AM headphone, an FM headphone, a TV monitor, a video monitor, a video projector, and an integrated video display.

Alternatively, the data-exchange protocol system includes at least one connectivity type selected from the group consisting of: a network protocol, a file-system protocol, a communication protocol, a wired connection, a wireless connection, a Bluetooth connection, an Ethernet connection, a cellular connection, a Wi-Fi connection, a 3G connection, and a 4G connection.

Alternatively, the A/V orchestrator is implemented by at least one A/V component configuration selected from the group consisting of: a single A/V orchestrator configured to run as a separate component; a single A/V orchestrator embodied in another A/V component; more than one A/V orchestrator for providing redundant functionality in order to optimize performance; and more than one A/V orchestrator for providing fail-safe backup functionality in order to switch orchestrator control in case of malfunction or connectivity loss.

Alternatively, the A/V data is implemented by at least one source type selected from the group consisting of: an A/V file, multiple A/V files containing segments of A/V data, multiple AV files containing identical A/V data, and at least one A/V streaming source.

Alternatively, at least one synchronization notification includes at least one time-synchronization type selected from the group consisting of: synchronization according to an orchestrator clock on the A/V orchestrator, synchronization according to at least one respective system clock, and synchronization according to an external-component clock.

Alternatively, at least one synchronization notification includes at least one A/V data parameter selected from the group consisting of: a frame number of an A/V frame, a frame timestamp of the A/V frame, a location timestamp of an A/V data location, and a system timestamp of the A/V data location.

Alternatively, the A/V orchestrator is operative under high-latency conditions of the data-exchange protocol system.

Most alternatively, the high-latency conditions are defined as any of operation elements (i)-(v) of the synchronization module in operation exceeding at least in part a transmission time of about 30 milliseconds.

Most alternatively, the high-latency conditions are defined as any of operation elements (i)-(vi) of the synchronization module in operation exceeding at least in part a transmission time of about 30 milliseconds.

Alternatively, the repetitively sending includes sending additional synchronization notifications in order to adjust in effect a respective A/V playback speed of the A/V data on at least one external A/V system, thereby compensating for playback-speed inaccuracies.

Alternatively, the repetitively synchronizing maintains at least one external A/V system in a synchronized state having a deviation within a range of up to about 20 milliseconds.

According to the present invention, there is provided for the first time a non-transitory computer-readable storage medium, having computer-readable code embodied on the non-transitory computer-readable storage medium, for distributed audio/video (A/V) synchronization and playback, the computer-readable code including: (a) program code for enabling identification of an A/V orchestrator by at least one external A/V system using a data-exchange protocol system; (b) program code for enabling configuration information to be available to at least one external A/V system; (c) program code for identifying A/V data from an A/V source to at least one external A/V system; (d) program code for repetitively synchronizing at least one respective system clock with an orchestra timing on the A/V orchestrator; and (e) program code for repetitively sending at least one synchronization notification to at least one external A/V system, wherein at least one synchronization notification is configured to: (i) indicate a given timing in the orchestra timing during A/V playback; (ii) indicate a given position in the A/V data during A/V playback; and (iii) instruct at least one external A/V system to move to a currently-playing A/V segment in the A/V data for A/V playback.

Alternatively, the computer-readable code further includes: (f) program code for enabling calculation, by at least one external A/V system, of the currently-playing A/V segment based on at least one synchronization notification.

Alternatively, the identification is performed by at least one process selected from the group consisting of: using a configuration file, querying a remote service, and listening to a broadcast channel.

Alternatively, at least one external A/V system includes at least one A/V component selected from the group consisting of: a speaker, a wired headphone, a wireless headphone, a Bluetooth headphone, an AM headphone, an FM headphone, a TV monitor, a video monitor, a video projector, and an integrated video display.

Alternatively, the data-exchange protocol system includes at least one connectivity type selected from the group consisting of: a network protocol, a file-system protocol, a communication protocol, a wired connection, a wireless connection, a Bluetooth connection, an Ethernet connection, a cellular connection, a Wi-Fi connection, a 3G connection, and a 4G connection.

Alternatively, the A/V orchestrator is implemented by at least one A/V component configuration selected from the group consisting of: a single A/V orchestrator configured to run as a separate component; a single A/V orchestrator embodied in another A/V component; more than one A/V orchestrator for providing redundant functionality in order to optimize performance; and more than one A/V orchestrator for providing fail-safe backup functionality in order to switch orchestrator control in case of malfunction or connectivity loss.

Alternatively, the A/V data is implemented by at least one source type selected from the group consisting of: an A/V file, multiple A/V files containing segments of A/V data, multiple AV files containing identical A/V data, and at least one A/V streaming source.

Alternatively, at least one synchronization notification includes at least one time-synchronization type selected from the group consisting of: synchronization according to an orchestrator clock on the A/V orchestrator, synchronization according to at least one respective system clock, and synchronization according to an external-component clock.

Alternatively, at least one synchronization notification includes at least one A/V data parameter selected from the group consisting of: a frame number of an A/V frame, a frame timestamp of the A/V frame, a location timestamp of an A/V data location, and a system timestamp of the A/V data location.

Alternatively, the A/V orchestrator is operative under high-latency conditions of the data-exchange protocol system.

Most alternatively, the high-latency conditions are defined as any of the program code (a)-(e) in operation exceeding at least in part a transmission time of about 30 milliseconds.

Most alternatively, the high-latency conditions are defined as any of the program code (a)-(f) in operation exceeding at least in part a transmission time of about 30 milliseconds.

Alternatively, the repetitively sending includes sending additional synchronization notifications in order to adjust in effect a respective A/V playback speed of the A/V data on at least one external A/V system, thereby compensating for playback-speed inaccuracies.

Alternatively, the repetitively synchronizing maintains at least one external A/V system in a synchronized state having a deviation within a range of up to about 20 milliseconds.

These and further embodiments will be apparent from the detailed description that follows.

BRIEF DESCRIPTION OF THE DRAWINGS

The present invention is herein described, by way of example only, with reference to the accompanying drawings, wherein.

DESCRIPTION OF THE ILLUSTRATIVE EMBODIMENTS

The present invention relates to methods and devices for distributed A/V synchronization and playback using an A/V orchestrator. The principles and operation for providing such methods and devices, according to the present invention, may be better understood with reference to the accompanying description and the drawings.

Figure 1:
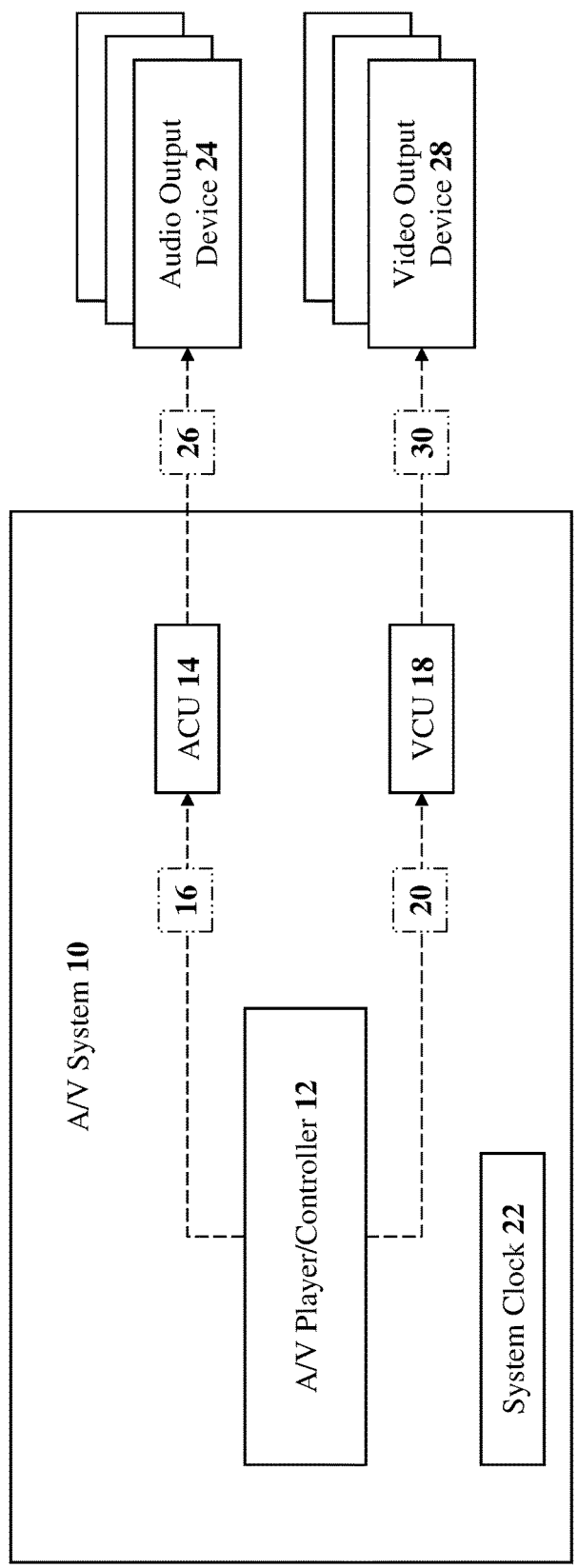
FIG. 1 is a simplified high-level schematic diagram of a typical A/V system configuration for A/V synchronization and playback, according to the prior art.

Referring to the drawings, FIG. 1 is a simplified high-level schematic diagram of a typical A/V system configuration for A/V synchronization and playback, according to the prior art. An A/V system 10 having an A/V player/controller 12 is shown operationally connected to an audio control unit 14 (ACU 14) via a communication channel 16, and a video control unit 18 (VCU 18) via a communication channel 20. Communication channels 16 and 20 may be the same communication link.

A/V player/controller 12 is responsible for (1) accessing the A/V data which may be stored in any valid format and encoded in any valid encoding system, and (2) delivering the audio data and video data in segmented streams to ACU 14 and VCU 18, while (3) continuously synchronizing the audio and video streams prior to identifying the correct subsequent segment. ACU 14 is responsible for rendering the audio data into sound, while VCU 18 is responsible for rendering the video data into images. A/V player/controller 12 uses an internal system clock 22 for A/V synchronization.

While A/V system 10 may further include its own A/V output devices, various audio output devices 24 (e.g., speakers, headphones, BT headphones, and AM/FM headphones) can be operationally connected to ACU 14 via a communication channel 26. Similarly, various video output devices 28 (e.g., TV monitors, video monitors, and video projectors) can be operationally connected to VCU 18 via a communication channel 30. Any combination of communication channels 56, 60, 66, and 70 (which are audio and/or video communication links) may be the same communication link.

As A/V player/controller 12 continuously synchronizes the audio and video streams prior to sending them to ACU 14 and VCU 18 for playback, the currently-playing segments must be transmitted, processed, and displayed/played on audio output device 24 and video output device 28 at approximately the same time. This means that communication channels 16, 20, 26, and 30 must all be communication links that can guarantee a high-enough bandwidth as well as a low-enough latency (or at least a known and fixed latency that A/V player/controller 12 can intentionally offset during A/V synchronization).

Using any communication links that cannot guarantee such bandwidth and latency requirements might cause the audio and video streams, while synchronized when being sent by A/V player/controller 10, to reach their destination and be displayed/played at significantly different times, thereby causing synchronization errors to occur.

Figure 2:
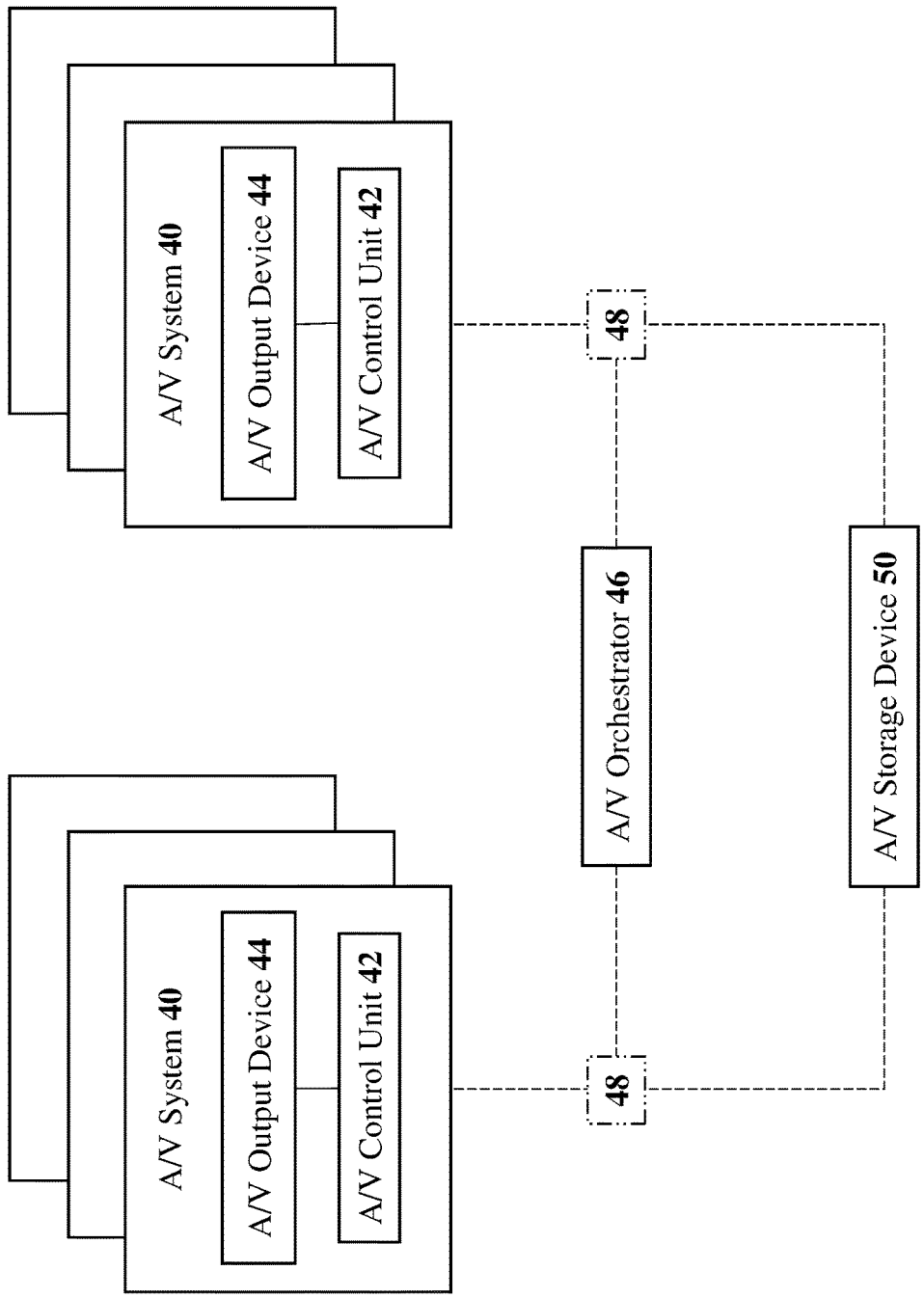
FIG. 2 is a simplified high-level schematic diagram of an A/V orchestrator architecture for distributed A/V synchronization and playback, according to embodiments of the present invention.

FIG. 2 is a simplified high-level schematic diagram of an A/V orchestrator architecture for distributed A/V synchronization and playback, according to embodiments of the present invention. An A/V system 40 is shown having an A/V control unit 42 and an A/V output device 44. Implementations may include more than one A/V system 40 (as represented in FIG. 2) which are devices capable of decoding and displaying video data and/or decoding and playing audio data. A/V systems 40 typically include set-top boxes, smartphones, tablets, laptops, and personal computers.

Each and every A/V system 40 locates an A/V orchestrator 46, communicates with A/V orchestrator 46 to synchronize their clocks, and retrieves configuration data. A/V system 40 and A/V orchestrator 46 are operationally connected via a high- or low-latency communication channel 48 (e.g., hard wiring, Wi-Fi, BT, Ethernet, cellular 3G/4G, or any other supported protocol).

Once operationally connected to A/V orchestrator 46, A/V system 40 can locate an A/V storage device 50. A/V control unit 42 retrieves A/V data from A/V storage unit 50, then decodes the data, and sends the data for rendering to A/V output device 44. A/V output device 44 typically include any video or audio output device such as a TV monitor, a video projector, audio headsets, and audio speakers. Although A/V storage device 50 is shown as a single unit in FIG. 2, A/V storage device 50 may also be implemented as separate units one holding the audio data and another holding the video data, for example. Furthermore, for redundancy and performance reasons, there could be several physical devices operating as A/V storage device 50.

A/V orchestrator 46 periodically sends messages, informing all A/V systems 40 which A/V segment is currently being played. An example of such a message would be, "Currently playing audio position X and/or video position Y at time T." X is a position in the audio data file, Y is the associated position in the video data file, and T is the synchronized clock time at which X and/or Y were delivered for rendering and playback. Upon receiving such messages, all A/V systems 40 adjust the current position in the respective A/V files to continue playback from.

In implementation, such "checkpoint" messages are allowed to be significantly delayed in arriving at A/V systems 40 without any negative impact on the concerted, play-display synchronization of the A/V orchestra. In this sense, the A/V orchestra is not only synchronized, but also "concerted" by also allowing for such delays without impacting playback. Furthermore, since the A/V data itself can be accessed by all of A/V systems 40 directly from A/V storage device 50, rather than via A/V orchestrator 46, and in most cases even in advance, the integrated system architecture inherently tolerates use of high-latency and/or low-bandwidth links/networks for communication channel 48 connecting A/V systems 40 to A/V orchestrator 46 and A/V storage device 50.

Figure 3:
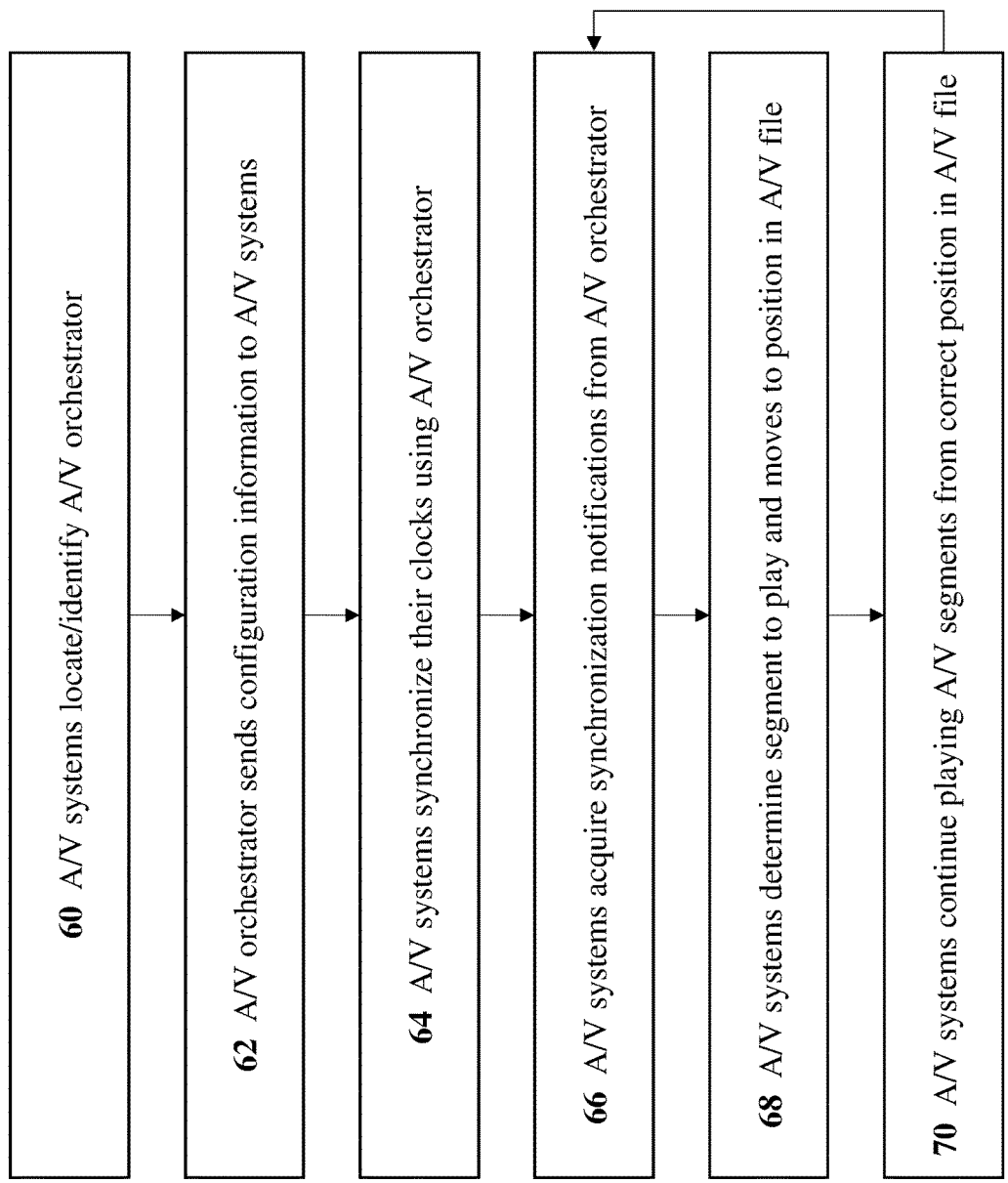
FIG. 3 is a simplified flowchart of the major process steps of an A/V orchestrator for distributed A/V synchronization and playback, according to embodiments of the present invention.

FIG. 3 is a simplified flowchart of the major process steps of an A/V orchestrator for distributed A/V synchronization and playback, according to embodiments of the present invention. The process starts with A/V systems locating/identifying the A/V orchestrator (Step 60). Any A/V system that joins the distributed A/V orchestra (i.e., the synchronized, operationally-connected assemblage of A/V systems) initially locates the A/V orchestrator. Such identification may be performed by using a configuration file, querying a remote service, listening to a broadcast channel, or any other identification method. The A/V orchestrator then sends configuration information to any A/V system that joined the A/V orchestra (Step 62).

Such information includes, inter alia, the locations of A/V files containing A/V content being (and/or to be) played. The A/V systems that joined the A/V orchestra synchronize their clocks with the A/V orchestrator so that all A/V systems participating in the orchestrated A/V performance (i.e., concerted, A/V play-display synchronization) have their clocks synchronized with the A/V orchestrator's clock at every point in time (Step 64). Clock synchronization may be performed using any appropriate method. All A/V systems then acquire periodic notifications from the A/V orchestrator with the exact position in the A/V file and the exact clock time of playback (Step 66). Such a pointer to the exact recently-played segment may be expressed as a timestamp offset from the beginning of the A/V file, a frame number, or any other appropriate method.

Since the clocks of all A/V systems are synchronized, each A/V system receiving such a "checkpoint" message with such a pointer can calculate the exact segment of the A/V file that has to be played "now" (regardless of how long it takes for the A/V orchestrator's messages to be received) simply by calculating the time difference between the A/V orchestrator's message and the true current time, and then adjusting the pointer forward accordingly. Once such a pointer is calculated, such an A/V system can adjust the playback position to the correct segment (Step 68). The A/V systems then continue synchronously playing A/V segments from the correct position in the A/V file (Step 70). The concerted, A/V play-display synchronization process is periodically updated by subsequent synchronization notifications (Step 66).

Note that the A/V orchestrator may be one of the A/V systems (designated to take the role of a central A/V orchestrator during system setup), may be a separate device, or may be distributed over several A/V systems or devices. The functions of the A/V orchestrator include synchronizing clocks, sending A/V synchronization messages, and publishing the orchestra configuration. Such functions may be performed by the same device or program, or may be distributed among several devices or programs. In either case, such devices and/or programs are intended herein to collectively refer to the A/V orchestrator.

A typical implementation of the A/V orchestra could include a single A/V system such as a computer connected to a video monitor along with many A/V systems such as smartphones for viewers to listen to the related soundtrack. In such an A/V orchestra, the computer displays a video file, and takes the role of the A/V orchestrator. All smartphones synchronize their clocks with that computer, occasionally receiving a synchronization message from the computer. According to synchronization messages, the smartphones adjust the pointer in the currently-playing audio stream to maintain A/V synchronization.

While the present invention has been described with respect to a limited number of embodiments, it will be appreciated that many variations, modifications, and other applications of the present invention may be made.

What is claimed is:

1. A method for distributed audio A&V video (AA&VV) synchronization and playback, the method comprising the steps of: (a) enabling identification of an A&V orchestrator by at least one external A&V system using a data-exchange protocol system, wherein said A&V orchestrator is a device including: a CPU for performing computational operations, a memory module for storing data, and a network connection for communicating across said data-exchange protocol system; (b) enabling configuration information to be available to said at least one external A&V system; (c) identifying A&V data from an A&V source to said at least one external A&V system; (d) repetitively synchronizing at least one respective system clock, associated with said at least one external A&V system, with an orchestra timing on said A&V orchestrator; (e) repetitively sending at least one synchronization notification to said at least one external A&V system, wherein said at least one synchronization notification is configured to: (i) indicate a given timing in said orchestra timing during A&V playback; (ii) indicate a given position in said A&V data during A&V playback; and (iii) instruct said at least one external A&V system to move to a currently-playing A&V segment in said A&V data for A&V playback; and (f) enabling calculation, by said at least one external A&V system, of said currently-playing A&V segment based on a previously-received synchronization notification by calculating a time difference between a past given timing of a respective, past, given position in said previously-received synchronization notification and a true current time of said at least one respective system clock.

2. The method of claim 1, wherein said identification is performed by at least one process selected from the group consisting of: using a configuration file, querying a remote service, and listening to a broadcast channel.

3. The method of claim 1, wherein said A&V orchestrator is implemented by at least one A&V component configuration selected from the group consisting of: a single A&V orchestrator configured to run as a separate component; a single A&V orchestrator embodied in another A&V component; more than one A&V orchestrator for providing redundant functionality in order to optimize performance; and more than one A&V orchestrator for providing fail-safe backup functionality in order to switch orchestrator control in case of malfunction or connectivity loss.

4. The method of claim 1, wherein said A&V data is implemented by at least one source type selected from the group consisting of: an A&V file, multiple A&V files containing segments of A&V data, multiple AV files containing identical A&V data, and at least one A&V streaming source.

5. The method of claim 1, wherein said at least one synchronization notification includes at least one time-synchronization type selected from the group consisting of: synchronization according to an orchestrator clock on said A&V orchestrator, synchronization according to said at least one respective system clock, and synchronization according to an external-component clock.

6. The method of claim 1, wherein said at least one synchronization notification includes at least one A&V data parameter selected from the group consisting of: a frame number of an A&V frame, a frame timestamp of said A&V frame, a location timestamp of an A&V data location, and a system timestamp of said A&V data location.

7. The method of claim 1, wherein said A&V orchestrator is operative under high-latency conditions of said data-exchange protocol system.

8. The method of claim 7, wherein said high-latency conditions are defined as any of steps (a)-(f) exceeding at least in part a transmission time of about 30 milliseconds.

9. The method of claim 1, wherein said step of repetitively sending includes sending additional synchronization notifications in order to adjust in effect a respective A&V playback speed of said A&V data on said at least one external A&V system, thereby compensating for playback-speed inaccuracies.

10. The method of claim 1, wherein said step of repetitively synchronizing maintains said at least one external A&V system in a synchronized state having a deviation within a range of up to about 20 milliseconds.

11. A device for distributed audio & video (A&V) synchronization and playback, the device comprising: (a) a CPU for performing computational operations; (b) a memory module for storing data; (c) a network connection for communicating across a data-exchange protocol system; and (d) a synchronization module configured for: (i) enabling identification of an A&V orchestrator, embodied in said synchronization module, by at least one external A&V system using said data-exchange protocol system; (ii) enabling configuration information to be available to said at least one external A&V system; (iii) identifying A&V data from an A&V source to said at least one external A&V system; (iv) repetitively synchronizing at least one respective system clock with an orchestra timing on said A&V orchestrator; (v) repetitively sending at least one synchronization notification to said at least one external A&V system, wherein said at least one synchronization notification is configured to: (A) indicate a given timing in said orchestra timing during A&V playback; (B) indicate a given position in said A&V data during A&V playback; and (C) instruct said at least one external A&V system to move to a currently-playing A&V segment in said A&V data for A&V playback; and (vi) enabling calculation, by said at least one external A&V system, of said currently-playing A&V segment based on a previously-received synchronization notification by calculating a time difference between a past given timing of a respective, past, given position in said previously-received synchronization notification and a true current time of said at least one respective system clock.

12. The device of claim 11, wherein said identification is performed by at least one process selected from the group consisting of: using a configuration file, querying a remote service, and listening to a broadcast channel.

13. The device of claim 11, wherein said A&V orchestrator is implemented by at least one A&V component configuration selected from the group consisting of: a single A&V orchestrator configured to run as a separate component; a single A&V orchestrator embodied in another A&V component; more than one A&V orchestrator for providing redundant functionality in order to optimize performance; and more than one A&V orchestrator for providing fail-safe backup functionality in order to switch orchestrator control in case of malfunction or connectivity loss.

14. The device of claim 11, wherein said A&V data is implemented by at least one source type selected from the group consisting of: an A&V file, multiple A&V files containing segments of A&V data, multiple AV files containing identical A&V data, and at least one A&V streaming source.

15. The device of claim 11, wherein said at least one synchronization notification includes at least one time-synchronization type selected from the group consisting of: synchronization according to an orchestrator clock on said A&V orchestrator, synchronization according to said at least one respective system clock, and synchronization according to an external-component clock.

16. The device of claim 11, wherein said at least one synchronization notification includes at least one A&V data parameter selected from the group consisting of: a frame number of an A&V frame, a frame timestamp of said A&V frame, a location timestamp of an A&V data location, and a system timestamp of said A&V data location.

17. The device of claim 11, wherein said A&V orchestrator is operative under high-latency conditions of said data-exchange protocol system.

18. The device of claim 17, wherein said high-latency conditions are defined as any of operation elements (i)-(vi) of said synchronization module in operation exceeding at least in part a transmission time of about 30 milliseconds.

19. The device of claim 11, wherein said repetitively sending includes sending additional synchronization notifications in order to adjust in effect a respective A&V playback speed of said A&V data on said at least one external A&V system, thereby compensating for playback-speed inaccuracies.

20. The device of claim 11, wherein said repetitively synchronizing maintains said at least one external A&V system in a synchronized state having a deviation within a range of up to about 20 milliseconds.

21. A non-transitory computer-readable storage medium, having computer-readable code embodied on the non-transitory computer-readable storage medium, for distributed audio & video (A&V) synchronization and playback, the computer-readable code comprising: (a) program code for enabling identification of an A&V orchestrator by at least one external A&V system using a data-exchange protocol system; (b) program code for enabling configuration information to be available to said at least one external A&V system; (c) program code for providing A&V data from an A&V source to said at least one external A&V system; (d) program code for repetitively synchronizing at least one respective system clock with an orchestra timing on said A&V orchestrator; (e) program code for repetitively sending at least one synchronization notification to said at least one external A&V system, wherein said at least one synchronization notification is configured to: (i) indicate a given timing in said orchestra timing during A&V playback; (ii) indicate a given position in said A&V data during A&V playback; and (iii) instruct said at least one external A&V system to move to a currently-playing A&V segment in said A&V data for A&V playback; and (f) program code for enabling calculation, by said at least one external A&V system, of said currently-playing A&V segment based on a previously-received synchronization notification by calculating a time difference between a past given timing of a respective, past, given position in said previously-received synchronization notification and a true current time of said at least one respective system clock.

* * * * *